United States Patent [19]

Wade

[11] 4,142,935

[45] Mar. 6, 1979

[54] NUCLEAR REACTOR

[75] Inventor: Elman E. Wade, Ruffsdale, Pa.

[73] Assignee: Westinghouse Electric Corp., Pittsburgh, Pa.

[21] Appl. No.: 566,479

[22] Filed: Apr. 9, 1975

[51] Int. Cl.² .................................... G21C 19/00
[52] U.S. Cl. .............................. 176/87; 176/30; 176/50
[58] Field of Search ........................ 176/30–32, 176/50, 87; 220/3, 293

[56] References Cited

U.S. PATENT DOCUMENTS

| T911,015 | 6/1973 | Garkisch et al. | 176/40 |
|---|---|---|---|
| 2,219,659 | 10/1940 | Price | 220/3 |
| 2,835,404 | 5/1958 | Andrus | 220/3 |
| 3,054,741 | 9/1962 | Tatlock et al. | 176/30 |
| 3,313,599 | 4/1967 | Boon | 220/3 |
| 3,773,616 | 11/1973 | Aubert | 176/87 |
| 3,801,448 | 4/1974 | Brandstetter et al. | 176/87 |
| 3,841,964 | 10/1974 | Dumayne | 176/87 |
| 3,862,001 | 1/1975 | Marmonier et al. | 176/87 |

FOREIGN PATENT DOCUMENTS

| 1234243 | 10/1960 | France | 176/30 |
|---|---|---|---|
| 434497 | 10/1967 | Switzerland | 176/30 |

Primary Examiner—Harvey E. Behrend
Attorney, Agent, or Firm—L. A. DePaul; Z. L. Dermer

[57] ABSTRACT

A nuclear reactor including two rotatable plugs and a positive top core holddown structure. The top core holddown structure is divided into two parts: a small core cover, and a large core cover. The small core cover, and the upper internals associated therewith, are attached to the small rotating plug, and the large core cover, with its associated upper internals, is attached to the large rotating plug. By so splitting the core holddown structures, under-the-plug refueling is accomplished without the necessity of enlarging the reactor pressure vessel to provide a storage space for the core holddown structure during refueling. Additionally, the small and large rotating plugs, and their associated core covers, are arranged such that the separation of the two core covers to permit rotation is accomplished without the installation of complex lifting mechanisms.

6 Claims, 7 Drawing Figures

NUCLEAR REACTOR

BACKGROUND OF THE INVENTION

This invention relates generally to nuclear reactors and more particularly to a nuclear reactor utilizing rotating plugs and a split positive top core holddown structure.

A nuclear reactor produces heat by fissioning of nuclear materials which are fabricated into fuel elements and assembled within a nuclear core situated in a pressure vessel. In commercial nuclear reactors, the heat produced thereby is used to generate electricity. Such nuclear reactors typically comprises one or more primary flow and heat transfer loops, and a corresponding number of secondary flow and heat transfer loops to which conventional steam turbines and electrical generators are coupled. A typical energy conversion process for commercial nuclear reactors, therefore, involves transfer of heat from a nuclear core to the primary coolant flow system, to a secondary coolant flow system and finally into steam from which electricity is generated.

In a liquid cooled nuclear reactor, such as a liquid metal cooled breeder reactor, a reactor coolant, such as liquid sodium, is circulated through the primary coolant flow system. A typical primary coolant flow system comprises a nuclear core within a reactor vessel, a heat exchanger, and a circulating pump. In nuclear reactors having more than one primary flow loop within the primary system, the nuclear core and the reactor pressure vessel are common to each of the primary loops.

The heat generated by the nuclear core is removed by the reactor coolant which flows into the reactor vessel and through the reactor core. The heated reactor coolant then exits from the reactor vessel and flows through the heat exchangers which transfer the heat to secondary flow systems associated therewith. The cooled reactor coolant exits from the heat exchangers and flows to a circulating pump which again circulates the coolant to the pressure vessel, repeating the described flow cycle.

The nuclear reactor pressure vessel is generally sealed at its top by a cover known generally as a closure head. In fast-neutron energy reactors, such as a liquid metal cooled breeder reactors, it is customary for the closure head to include one or more rotatable members known as plugs. By suitable rotation of these plugs, it is possible for the instrumentation, control, and handling equipment located on these plugs to be positioned above all desired locations in the nuclear core. In this manner, it is possible to provide under-the-plug refueling; that is, refueling of the nuclear core occurs while the closure head is maintained in its location atop the pressure vessel and core.

In liquid metal cooled breeder reactors, it is customary to provide a positive top core holddown to help maintain the fuel elements in their position during reactor operations, or in the unlikely event of a core disruptive accident. This core holddown structure, and the upper internals of which it is an integral part, also function to guide, protect, and maintain alignment for the various control mechanisms and instrumentations.

The core holddown structure must be positioned on top of the nuclear core during normal reactor operations. However, during special operations, such as rotation of the plug for refueling, the core holddown structure must be raised off its position on top of the nuclear core before the rotation of the plugs can occur. Additionally, during refueling operations, the core holddown structure must permit accessibility of the nuclear core by the fuel handling equipment.

The prior art attempted to solve this problem by attaching the core holddown structure, and the remainder of the upper internals, to a small rotating plug. During normal reactor operations, this core holddown structure was seated on top of, and completely covered, the nuclear core. For refueling, this small plug and attached core holddown structure was mechanically raised, and rotated out of its position atop of the nuclear core by the rotation of the large plug. Refueling then occurs by means of a grapple, or an expansible arm, which was located underneath the large rotating plug. The problem associated with this method was that, in order to free the top of the nuclear core, the core holddown structure had to be rotated out from atop the nuclear core. This meant that a large free space was necessary around the core for the displacement of the core holddown structure during refueling. This free space had to occur within the reactor pressure vessel, and necessitated the building of a nuclear reactor pressure vessel having a diameter much larger than that of the nuclear core.

Another method utilized in the prior art, as exemplified by U.S. Pat. No. 3,773,616, was to attach the core holddown structure to the small rotatable plug eccentric to the axis of the small plug. In this position, the core holddown structure could be rotated away from its position atop the nuclear core by the rotation of the small plug. Although this method reduced somewhat the size requirements of the pressure vessel, it nevertheless did require additional space within the pressure vessel for the movement of the core holddown structure.

Both of the aforementioned methods required the use of special equipment whose only function was the vertical movement of the core holddown structure off its position atop the nuclear core. This added unwanted complexity to an already complex system.

U.S. Pat. No. 3,862,001 discloses a nuclear reactor having a portion of the upper internals and a portion of a core cover attached to each of two rotatable plugs. This system reduced the size requirements of the pressure vessel to that substantially the same as the size of the core. The system did not, however, provide positive top core holddown, and accordingly did not discuss means for vertically moving the core cover.

SUMMARY OF THE INVENTION

The aforementioned disadvantages of the prior art are eliminated by this invention by providing a positive top core holddown structure without the necessity of maintaining a free space within the reactor pressure vessel into which the core holddown structure is moved during refueling operations. The core holddown structure, and the upper internals associated therewith, is split into two sections; a large core cover and a small core cover. The large core cover, having a diameter substantially equal to that of the nuclear core, is attached to the large rotating plug above. The large core cover has an opening therethrough, and in this opening is located the small core cover. The small core cover has a diameter substantially equal to the radius of the large core cover, and is attached to the small rotating plug. The small core cover is positioned eccentric to the axis of the large core cover, and is displaced a distance substantially equal to the radius of the small core cover.

A material handling column, having a diameter substantially equal to the radius of the small core cover, is positioned on the small core cover, and it is radially offset from the axis of the small core cover a distance approximately equal to the radius of the material handling column. The fuel handling equipment, which is located within the material handling column, can then be positioned over any fuel assembly by a suitable rotation of the large and small core covers. Because of these rotations, the core holddown structure need not, at any time, extend radially outwardly from the nuclear core. Additionally, only a simple mechanism is required to lift the core holddown structure off the core, and to separate the two segments of the core holddown structure to permit rotation.

BRIEF DESCRIPTION OF THE DRAWINGS

Reference is now made to the description of the preferred embodiment, taken in connection with the accompanying drawings, in which.

DESCRIPTION OF THE PREFERRED EMBODIMENT

Figure 1:
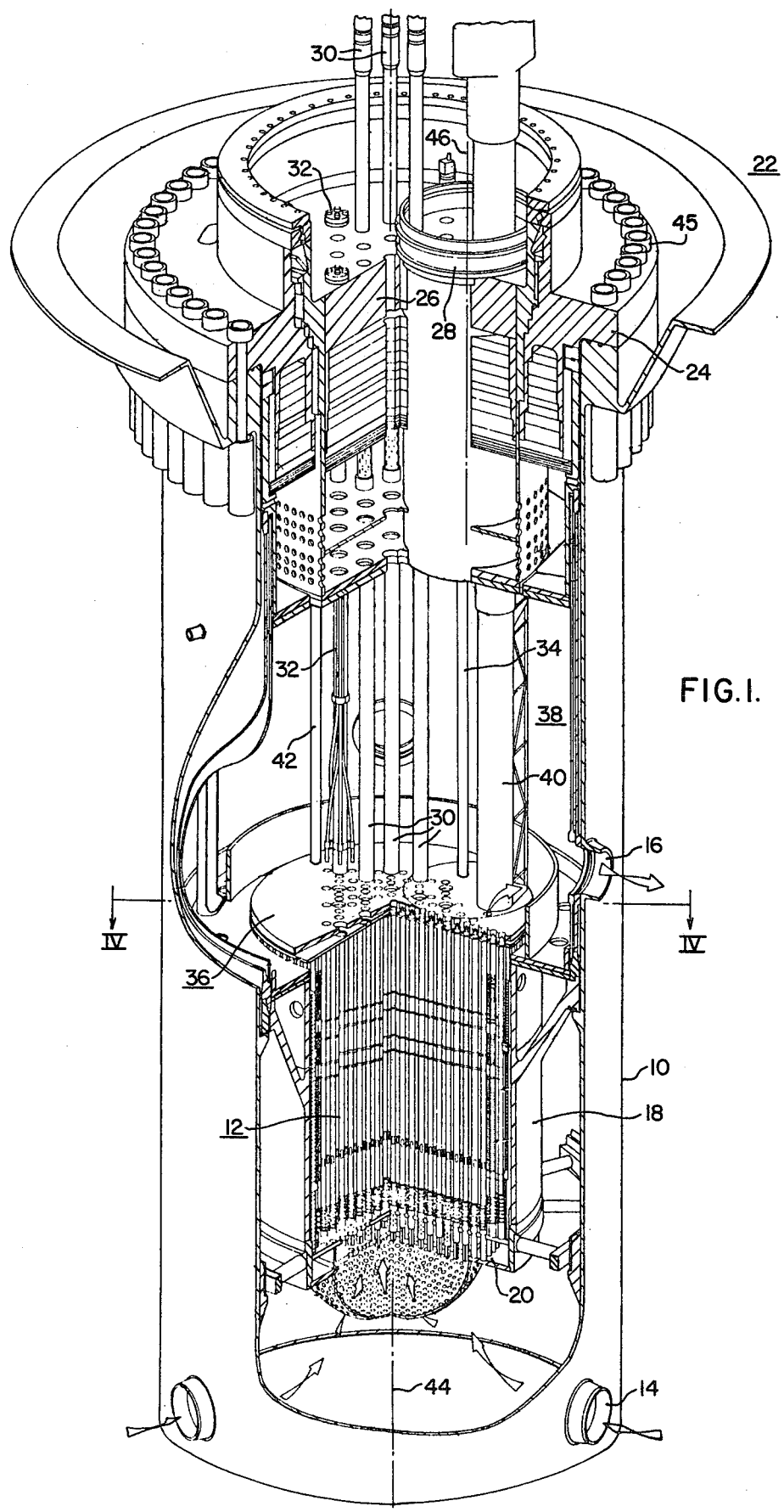
FIG. 1 illustrates a typical nuclear reactor utilizing this invention.

Throughout the description which follows, like reference characters indicate like elements in the various figures of the drawings.

Referring now more particularly to FIG. 1, a cylindrical elongated nuclear reactor pressure vessel 10 houses a nuclear core 12. The pressure vessel 10 has coolant flow inlet means 14 and coolant flow outlet means 16 formed integral with and through its cylindrical walls. The nuclear core 12 is surrounded by a cylindrical core barrel 18 which is part of, and integral with a core supporting structure 20.

The top of the pressure vessel 10 is closed by a closure head 22. The closure head 22 in this instance is comprised of a stationary outer ring 24, a large rotating plug 26, rotatable coupled to the outer ring 24, and a small rotating plug 28, which is rotatable coupled to the large rotating plug 26. The outer ring 24 is secured to the pressure vessel 10 by a plurality of bolts 45.

A plurality of penetrations, such as control rod drives 30 and core instrumentation 32, pass through both the large rotating plug 26 and the small rotating plug 28. The penetrations, 30 and 32, pass through the two plugs 26 and 28 to the cylindrical core holddown structure 36. Rigid vertical extensions 34 and 42 connect the core holddown structure 36 and the large and small plugs 26 and 28 respectively. The core holddown structure 36, the control rod drive 30, the core instrumentation 32, and the vertical extensions 34 and 42, together form a general rigid structure known as an upper internal structure 38. This upper internal structure 38 functions to position, protect, guide, support, and align the various mechanisms to the proper locations within the core 12. Also included in the upper internal structure 38 is a material handling column 40, in which fuel handling equipment (not shown) is located for refueling operations.

The cylindrical pressure vessel 10 has an axis designated in FIG. 1 as the line 44. In addition to being the axis 44 of the pressure vessel 10, the line 44 is also the axis for the core 12, the core barrel 16, the support structure 20, the core holddown structure 36, the stationary outer ring 24, and the large rotating plug 26. The small rotating plug 28 has an axis eccentric to the axis 44, and the small plug axis is designated as the line 46.

Figure 2:
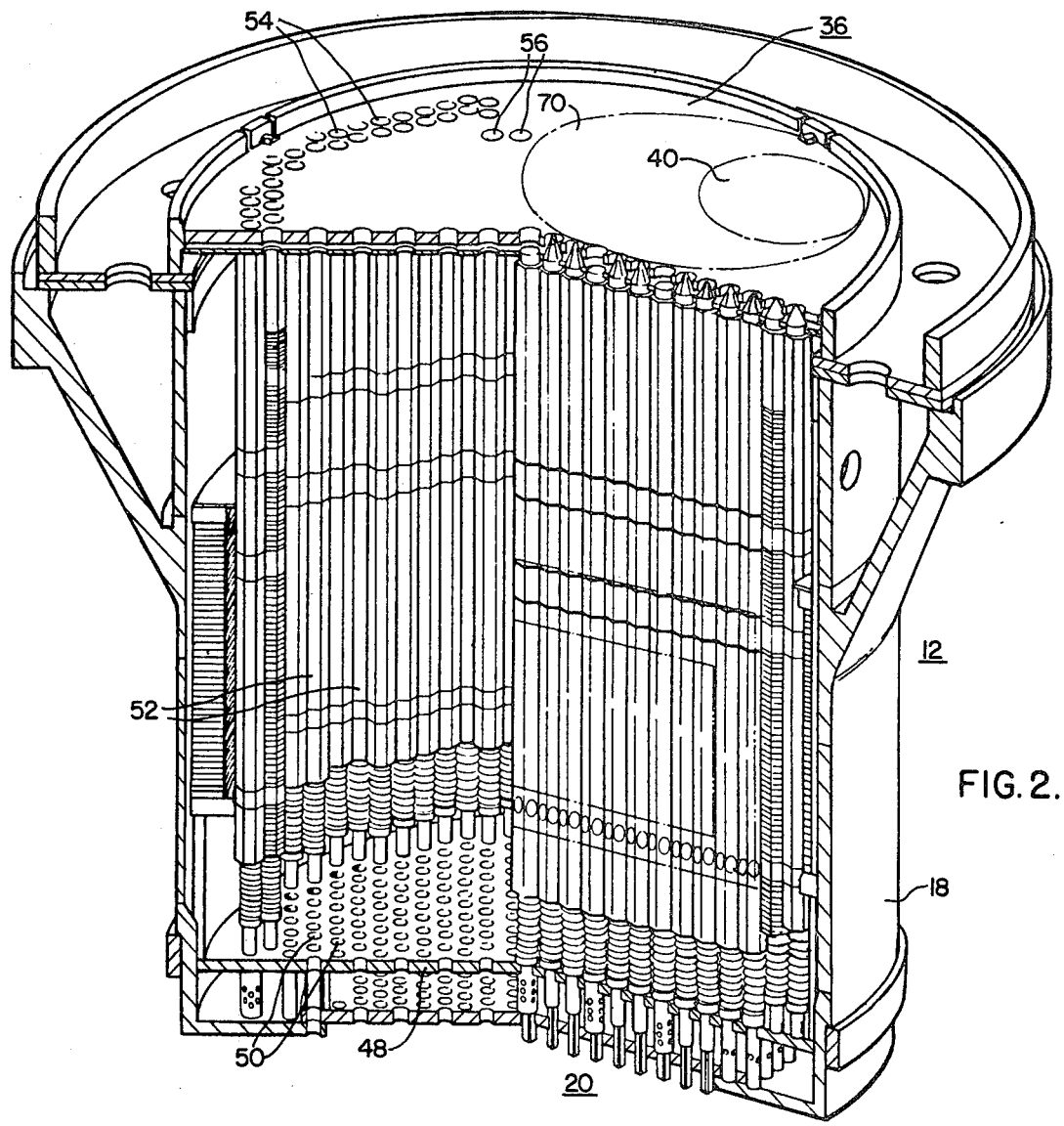
FIG. 2 is a detailed view of the core area of FIG. 1.

FIG. 2, a detailed view of the core area 12, illustrates the composition of the core 12. Core 12 is surrounded by the cylindrical core barrel 18. This core barrel is part of the core support structure 20 which also includes a lower core plate 48. The lower core plate 48 has a plurality of openings 50 into which the individual fuel assemblies 52 are positioned. The fuel assemblies 52 house fissile material (not shown) such as enriched uranium and plutonium. Positioned atop the core 12 and covering it, is the core holddown structure 36. The core holddown structure 36 has a plurality of openings 54 into which the fuel assemblies are located. Additionally, the core holddown structure 36 has openings 56 for the control rods (not shown), the control rod drives 30, and the core instrumentation 32.

Figure 3:
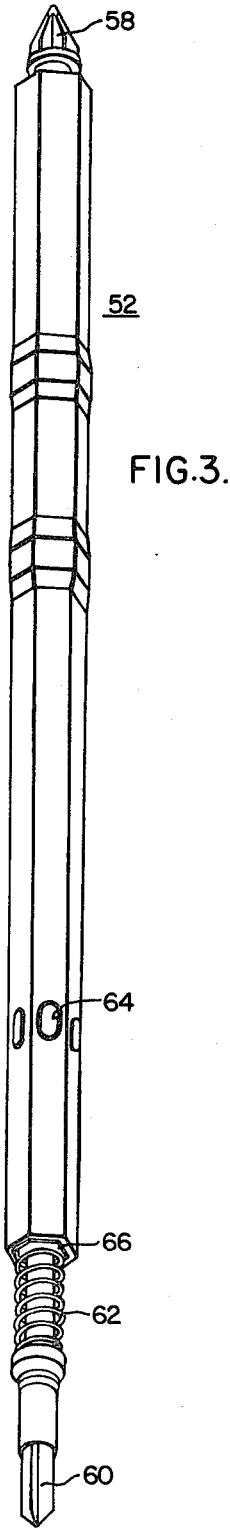
FIG. 3 is a detailed view of a fuel assembly utilized in this invention.

Referring now to FIG. 3, a typical fuel rod assembly 52 has at its top an upper nozzle 58. This upper nozzle 58 is located in the opening 54 of the core holddown structure 36 when the core holddown structure 36 is positioned atop the nuclear core 12, such as during normal operations. At the bottom of the fuel assembly 52 is a lower nozzle 60. This lower nozzle 60 fits into the openings 50 in the lower core support plate 48. Openings 64 in the fuel assembly 52 permit reactor coolant, such as liquid sodium, to flow into the fuel assembly 52 to remove heat generated by the fissile material situated therein.

During reactor startup, the core holddown structure 36 is placed on top of the core 12. This core holddown structure 36 maintains the position of the fuel assemblies 52 in their proper locations. In going from non-operational to operational status, the temperature of the liquid coolant may rise by as much as 800° F. The shell 66 of the fuel assemblies 52, which contain fissile material within them, will expand in length during this change. Because the core holddown structure 36 and the lower core support plate 48 are rigid, means must be provided to absorb this expansion of the shell 66, or else great amounts of strain and buckling may occur. One means of absorbing this expansion is by use of springs 62. These springs 62 compress during the expansion of the shell 66 of the fuel assemblies 52, thereby preventing buckling and cracking of the fuel assemblies 52. Each fuel assembly 52 has a spring 62 associated therewith.

Figure 4:
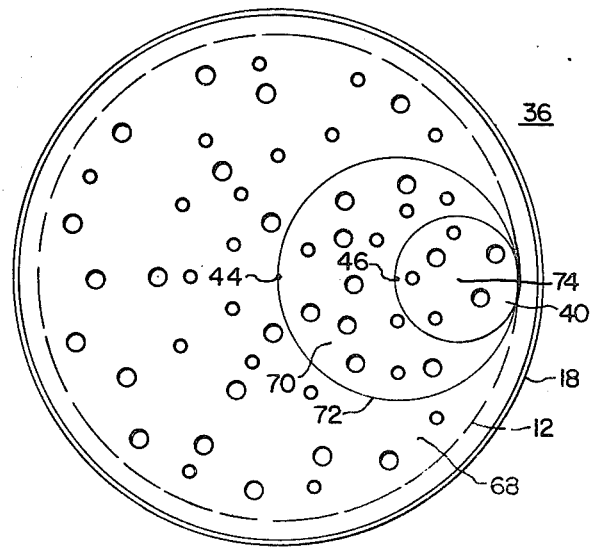
FIG. 4 is a plan view of the core holddown structure taken along line IV—IV of FIG. 1.

The core holddown structure 36 is comprised of two separate sections; a large core cover 68, and a small core cover 70 (see FIG. 4). The large core cover 68 has a diameter substantially equal to the core 12 diameter, and is coaxial with the axis 44 of the pressure vessel 10 and the core 12. The large core cover 68 has an opening 72, and in this opening is located the small core cover 70. The small core cover 70 is coaxial with the axis 46 of the small rotating plug 28. The small core cover 70 has a diameter which is substantially equal to the radius of the large core cover 68. The axis 46 of the small core cover 70 is radially displaced from the axis 44 of the large core cover 68 a distance substantially equal to the radius of the small core cover 70.

Located on the small core cover 70 is the material handling column 40. The material handling column 40, which houses the fuel transfer equipment (not shown), has a diameter substantially equal to the radius of the small core cover 70. The axis 74 of the material handling column 40 is eccentric to the axis of both the large core cover 44 and the small core cover 46, and is radially displaced from the axis 46 of the small core cover 70 a distance substantially equal to the radius of the material handling column 40. By simple geometrics, it is readily apparent that the axis 74 of the material handling column 40 is radially displaced from the axis 44 of the large core cover 68 a distance also equal to the radius of the material handling column 40. From these placements, it is apparent that the material handling column 40 can be positioned over any of the fuel assemblies 52 of the core 12 by the rotation of the large core cover 68 and the small core cover 70, without the necessity of moving the core holddown structure 36 radially away from the core 12.

Figure 5:
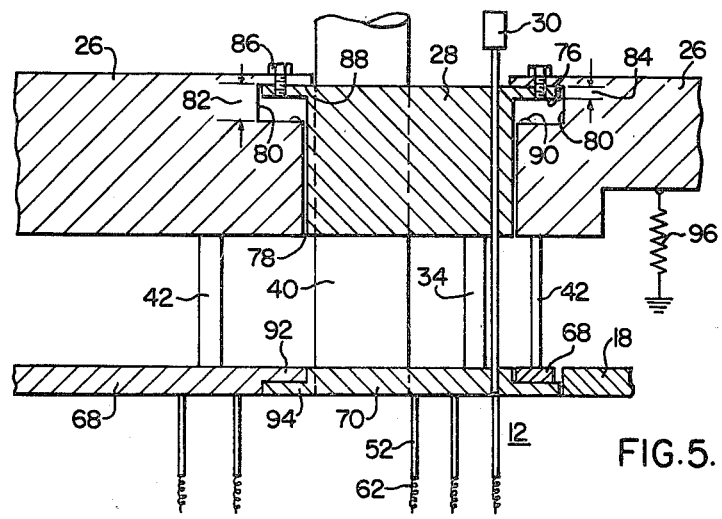
FIG. 5 is a schematic illustration of a core holddown structure and lifting mechanism.
Figure 6:
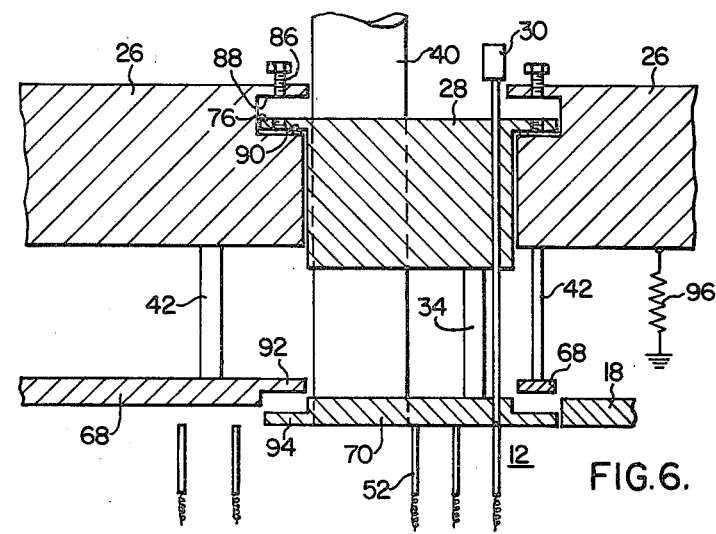
FIG. 6 is a schematic illustration of the equipment of FIG. 5 being prepared for refueling; and, FIG. 7 is a schematic illustration of the view of FIG. 5 during refueling operations.
Figure 7:
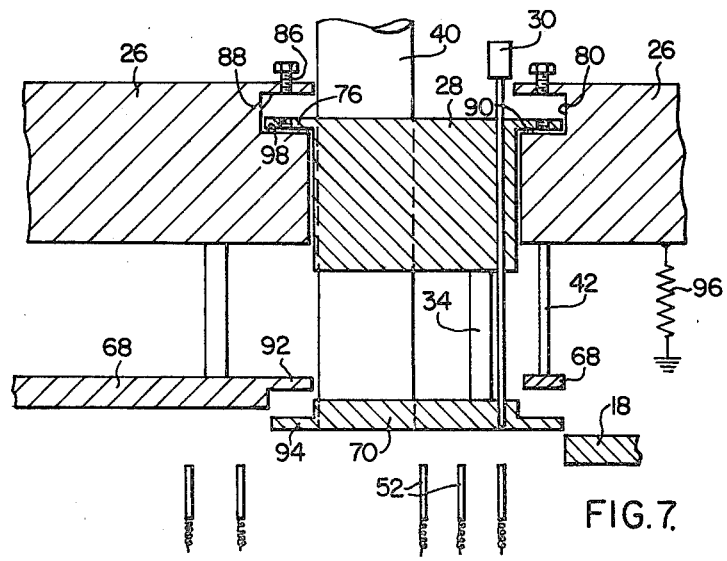

As one knowledgeable in the art would realize, neither the refueling nor the rotation can be accomplished until the core holddown structure 36 is removed from its position atop the core 12. FIGS. 5, 6, and 7 illustrate a simple mechanism for moving the core holddown structure 36 vertically away from the core 12. FIG. 5 schematically illustrates the relative position of the various elements during normal reactor operation. The small core cover 70 and the large core cover 68 are positioned atop the individual fuel elements 52 of the core 12. The small core cover 70 has one or more rigid vertical extensions 34 which connect it to the small plug 28. The large core cover 68 likewise has one or more rigid vertical extensions 42 which connect it to the large plug 26. The small plug 28 has an annular flange 76 extending radially outward. The large plug 26 has an opening 78 into which the small plug 28 is situated. Around the periphery of this opening 78, a slot 80 is located. The slot 80 has a vertical length 82 which is larger than the vertical width 84 of the flange 76. The flange 76 of the small plug 28 is positioned in the slot 80 of the large plug 26. Means 86, such as bolts, clamps, or other tensioning devices, secure the flange 76 of the small plug 28 to the top 88 of the slot 80. Located at the bottom of the slot 80 are means 90 for permitting the rotation of the small plug 28 without rotation of the large plug 26. Exemplarily of these means 90 are load bearings.

During normal operations, it is desirable to have the large core cover 68 and the small core cover 70 as close together as possible. This is accomplished by utilizing a flange 92 at the top of the large core cover, and another flange 94 at the bottom of the small core cover 70. The two flanges 92 and 94 of the core covers 68 and 70, respectively, overlap and meet whenever the core holddown structure 36 is in position atop the core 12.

When it is desired to begin refueling operations, (see FIG. 6) the securing means 86 are released. The large plug 26 is then vertically raised by axial movement means 96, such as jacks or screws, which, for example, may then be inserted into the joint between the large plug 26 and the outer ring 24. The lifting of the large plug 26 causes the vertical lifting of the large core cover 68 which is rigidly attached to it by the vertical extension 42. Because rotation of the small plug 28, and its associated small core cover 70, cannot be accomplished when the small core cover flange 94 and the large core cover flange 92 are together, means must be provided to separate the two flanges 92 and 94. As the large plug 26 is lifted, the upward force of the springs 62 lifts the small plug 28 and the small cover 70 to a short vertical distance. Once equilibrium between the small plug 28 and the springs 62 is reached, the small plug 28 will remain stationary. The large core cover 68 will be able to move away from the small core cover 70 because of the axial length 82 of the slot 80. The flange 76 of the small plug 28 remains stationary relative to the large plug 26, while the slot 80 is raised by the lifting of the large plug 26. In this manner no vertical movement is imparted to the small plug 28 relative to the large plug 26 in the interval between the time equilibrium between the small plug 28 and the springs 62 is reached and the time the small plug flange 76 moves against the bottom 98 of the slot 80 of the large plug 26. It is during this interval that this large core cover flange 92 and the small core cover flange 94 are separated.

The springs 62 exert an upward force through the shell 66 of the fuel assembly 52, and the total of the upward forces exerted by the springs 62 of all the fuel assemblies 52 upon which the small core cover 70 are situated should be substantially equal to, or greater than, the downward force imparted by the weight of the small plug 28, the small core cover 70, and their associated elements. As the weight which will be exerted downward is known, the springs 62 can be sized so as the sum total of the upward forces imparted by the springs 62 is sufficient to reach a stationary equilibrium state with the small core cover 70 and the small plug 28.

FIG. 7 illustrates the relative positions of the apparatus during refueling. Once the large core cover 68 is separated from the small core cover 70, it is desirable to raise the small core cover 70 off its position atop the fuel elements 52. This is accomplished by means 96 for axial movement of the small plug 28. This small plug axial movement means 96 is the flange 76 of the small plug 22 resting against the bottom 98 of the slot 80 of the large plug 26. Then, whenever the means 96 for axial movement of the large plug 26 are activated, the raising of the large plug 26 raises the small plug 28. The raising of the small plug 28 raises the small core cover 70 because of the rigid vertical extension 34 connecting the small core cover 70 and the small plug 28. After the small core cover 70 has been raised sufficient distance from the fuel assembly 52, the rotation of the material handling column 40 with its fuel handling equipment inside (not shown) can begin.

In going from refueling operations to normal operations, the reverse process is used. The means of axial movement 96 of the large plug 26 begins lowering the large plug 26 until the small core cover 70 is atop the fuel assemblies 52. Then, while the springs 62, the small core cover 70, and the small plug 28 are in a stationary equilibrium state, and the small plug 28 is stationary relative to axial movement of the large plug 26, the flange 76 of the small plug 28 rises within the slot 80 of the large plug 26 during the lowering of the large plug 26 until the large core cover 68 and its flange 92 come in contact with the small core cover 70 and its flange 94. Once this occurs, the flange 76 of the small plug 28 is against the top 88 of the slot 80, and the securing means 86 secure the large plug 26 to the flange 76 of the small plug 28. Then, any further downward movement of the large plug 26 causes a corresponding downward movement of the small plug 26 and the small core cover 70, including a compression of the springs 62 beneath the small core cover 70.

Thus, this invention provides positive top core holddown without the necessity of maintaining a free space within the reactor pressure vessel into which the holddown structure is moved during refueling operations, and which does not require the addition of complex mechanisms to vertically raise the core holddown structure of its position atop the nuclear core.

What is claimed is:

1. A nuclear reactor comprising:

a cylindrical pressure vessel having a supporting structure positioned therein;

means for closing said pressure vessel comprising;

an outer ring secured to said pressure vessel, said outer ring having an opening therein, said outer ring being coaxial with said pressure vessel;

an annular rotatable large plug positioned in said outer ring opening, said large plug being rotatably coupled to said outer ring, said large plug being coaxial with said pressure vessel, said large plug having a diameter, said large plug having an opening therein; an annular rotatable small plug positioned in said large plug opening, said small plug being rotatably coupled to said large plug, said small plug being eccentric to said pressure vessel, said small plug having a diameter smaller than said large plug diameter;

a nuclear core positioned in said pressure vessel above said supporting structure in coaxial relationship therewith, said nuclear core including therein a plurality of fuel rod assemblies;

a plurality of springs positioned adjacent said supporting structure, each of said fuel rod assemblies having a spring coupled thereto, a generally cylindrical core holddown structure positioned atop said nuclear core, said core holddown structure covering said nuclear core, said core holddown structure comprising;

a generally cylindrical large core cover coaxial with said nuclear core and said pressure vessel, said core cover having a diameter associated therewith, said large core cover having an opening therein, said large core cover having a rigid vertical extension associated therewith, said large core cover extension being secured to said large plug; and a generally cylindrical small core cover positioned in said large core cover opening, said small core cover being rotatable within said large core cover opening, said small core cover being eccentric to said nuclear core, said small core cover being coaxial with said small plug, said small core cover having a diameter substantially equal to one half of said large core cover diameter, said small core cover having a rigid vertical extension associated therewith, said small core cover extension being secured to said small plug, said small core cover having a radius associated therewith, said small core having an axis radially displaced from said large core cover axis a distance substantially equal to said small core cover radius;

said springs coupled to said fuel assemblies atop which said small core cover is positioned being of a size such that the combined upward axial force of said springs is substantially equal to the downward axial force of the weight of said small core cover and said small plug, said springs and said small core cover and said small plug capable of being in an equilibrium position in which said small plug will be axially stationary with said springs supporting said small core cover and said small plug.

2. The reactor according to claim 1 wherein said small core cover includes a material handling column, said material handling column passing through said small core cover and said small plug, said material handling column having a radius and a diameter, said material handling column diameter being substantially equal to said small core cover radius, said material handling column having its axis radially displaced from said small core cover axis a distance substantially equal to said material handling column radius.

3. The reactor according to claim 1 including means for axial movement of said large plug.

4. The reactor according to claim 3 including means for axial movement of said small plug.

5. The reactor according to claim 4 wherein said means for axial movement of said small plug includes means for preventing axial movement of said small plug relative to axial movement of said large plug comprising:

an annual flange extending radially outwardly from said small plug, said flange having a vertical width; and said large plug having a slot along the periphery of said opening therein, said flange of said small plug being positioned in said slot, said slot having a vertical length associated therewith, said vertical length of said slot being larger than said vertical width of said small plug flange.

6. The reactor according to claim 5 wherein said large plug includes means for securing said small plug flange to the top of said large plug slot.

* * * * *